Dec. 16, 1952 M. J. TERHO ET AL 2,621,819
LOADING AND UNLOADING DEVICE FOR MOTOR TRUCKS
Filed Nov. 10, 1949 2 SHEETS—SHEET 1
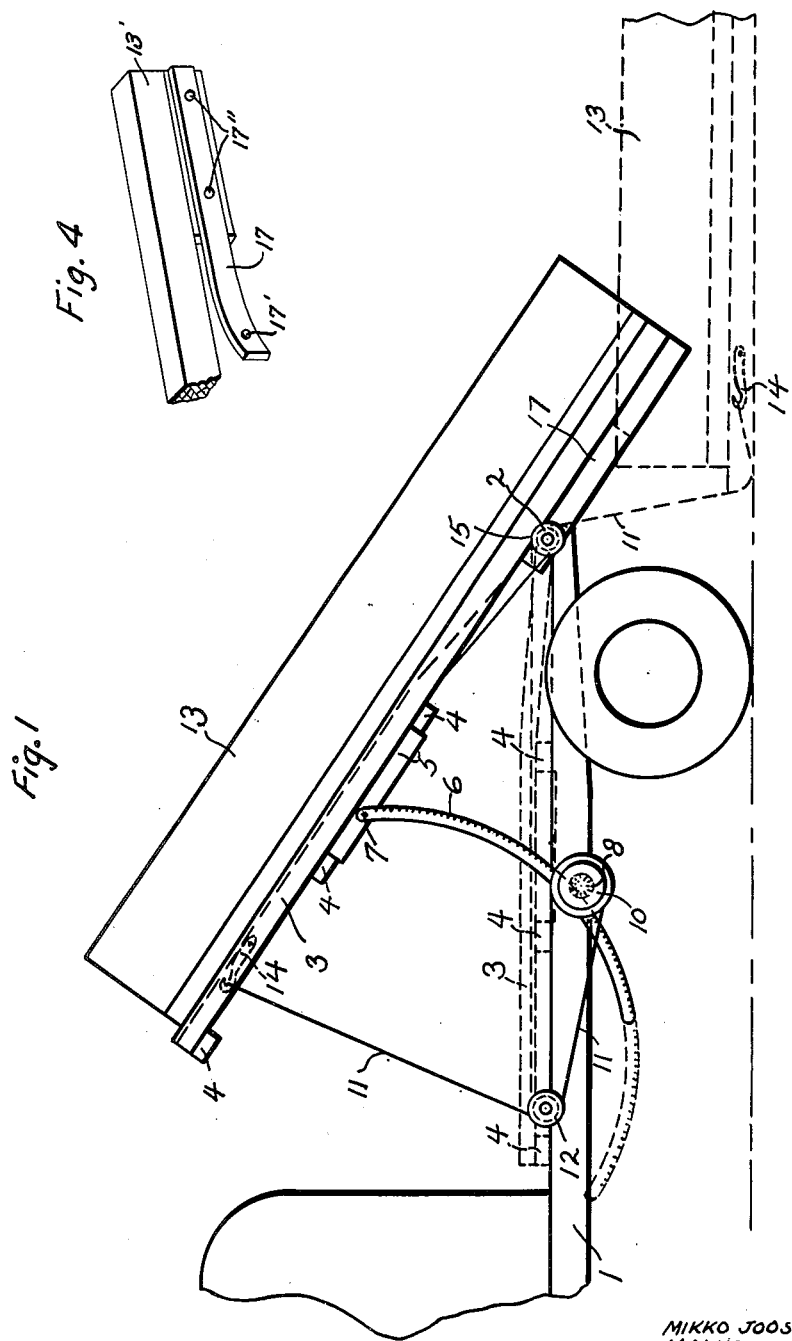
INVENTORS
MIKKO JOOSEPPI TERHO
MAUNO ANTTI TERHO
BY Herman L. Gordon
ATTORNEY Dec. 16, 1952     M. J. TERHO ET AL     2,621,819
LOADING AND UNLOADING DEVICE FOR MOTOR TRUCKS
Filed Nov. 10, 1949     2 SHEETS—SHEET 2
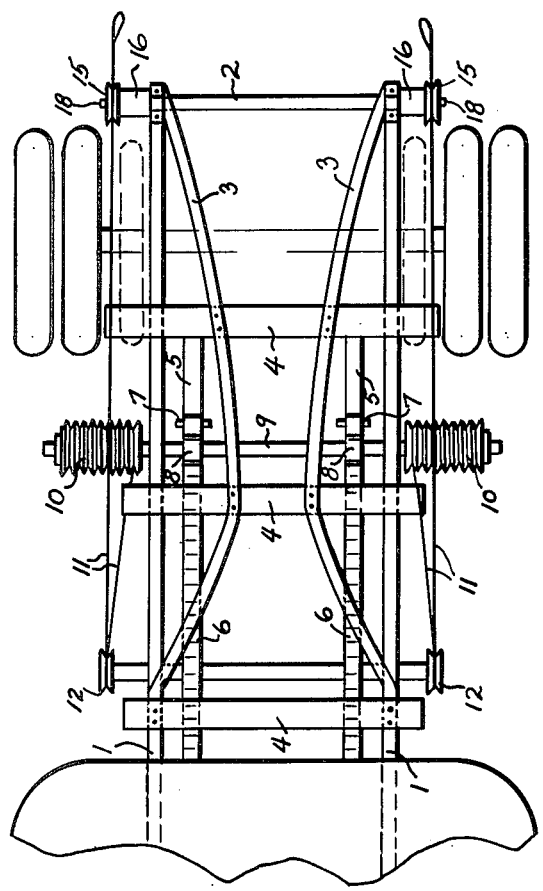
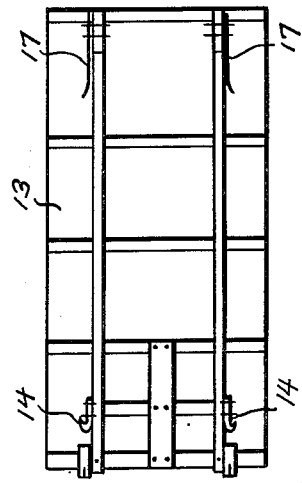
INVENTORS
MIKKO JOOSEPPI TERHO
MAUNO ANTTI TERHO
BY Herman L. Gordon
ATTORNEY Patented Dec. 16, 1952

2,621,819

UNITED STATES PATENT OFFICE 2,621,819

LOADING AND UNLOADING DEVICE FOR MOTOR TRUCKS

Mikko Jooseppi Terho and Mauno Antti Terho, Raisio as., Finland

Application November 10, 1949, Serial No. 126,606
In Sweden November 12, 1948

5 Claims. (Cl. 214—505)

This invention relates to loading and unloading motor trucks, and has for its object to provide a loading and unloading device for trucks of the kind described and comprises a loose bottom which is lowered to the ground for loading purposes and when loaded is hoisted onto the truck chassis to be trucked, and after having been trucked, is re-loaded to the ground by means of a winch or the like manually or mechanically operable contrivance. Particular characteristics of the invention are the provision of a winch for hoisting the bottom onto the chassis by means of a wire cable fixed to two holders on the load bottom, passing over guide rolls located on either side of the chassis; the provision of a tipper connected to the winch adapted to be used in lowering the load bottom; and the provision of support rolls mounted on the chassis and adapted to provide means on which the load bottom glides while being hoisted to or lowered from the chassis.

These and other features of the invention will be apparent from the following description with reference to the accompanying drawings which illustrate by way of example an embodiment of the invention, and in which:

Fig. 1 is a schematic side view of the device according to the invention,

Fig. 2 is a top view of the device according to the invention with the load bottom removed, and Fig. 3 shows the load bottom of the device as viewed from below.

Figure 4 is a perspective detail view of the lower rear portion of the load bottom, showing a perforated guide attached thereto.

Referring more particularly to the drawings, in Fig. 1 and Fig. 2 the numeral 1 designates the truck chassis, having rotatably mounted on the rear end thereof a transverse shaft 2 which is rigidly secured to a bridge formed by longitudinal rails 3 and transverse supporting beams 4, the longitudinal supports 5 of the said bridge having pivoted thereto, at point 7, the arcuate rack gears 6 of a tipper device, the driving gears 8 of the tipper device being secured to the axle 9 of a wire cable winch mounted on the chassis and operated, for example, by the truck motor by suitable coupling means, not shown. At both ends of the said axle 9, wire cable rollers 10 are located and send cables 11 around guide rolls 12 mounted on the chassis, to hooks 14 on load bottom 13. Both ends of the axle 2 have rotatably mounted thereon pulleys 15 for guiding the wire cable, and rolls 16 for supporting the load bottom, and providing the means on which the load bottom slides while being hoisted onto or while being lowered from the chassis.

Fig. 3 shows the hooks 14 on the load bottom and Figure 4 shows the guides or holders 17, made for example, of perforated plate spring, secured to the lower rear part 13' of the load bottom by bolts 17" and adapted to couple the load bottom while being hoisted to the pins 18 formed by the end parts of the shaft 2 and to cut off the pull when said end parts engage in the respective perforations 17' in the spring holders 17.

Instead of being perforated, the spring guides 17 may be longitudinally slotted, the pins 18 engaging in the slots as the load bottom is hoisted, the pull being cut off when the ends of the slots engage said pins.

Manually operable couplers are provided at the ends of the winch axle 9, which are adapted for detachably connecting the wire cable rolls of the winch to axle 9.

The device functions in the following manner:

When it is desired to hoist the lowered load bottom illustrated with dash lines in Fig. 1 onto the chassis of the truck, the wire cables 11 are passed over the guide rolls 12, 15 to the hooks 14 on the load bottom 13, after which the load bottom is hoisted by means of the winch operated, for example, by the motor of the truck, to the chassis. While being hoisted to the chassis the load bottom glides over the support rolls 16 and support beams 4 provided for resting the load bottom in transit. During the hoisting process, the arcuate rack gears 6 are disengaged from the gear wheels 8, as by elevating said arcuate rack gears manually or by a suitable lever mechanism and securing the elevated rack gears in any convenient manner to the chassis.

When the rotation direction of the winch axle is reversed and the arcuate rack gears 6 are engaged with the gear wheels 8 of the tipper, said gear wheels 8 rotate with the axle 9 and lift the bridge and the load bottom thereon into a raised inclined position, thereby enabling the load bottom in a specific position to slide down by gravity.

The invention is not limited to the embodiment hereinabove given as an example only, and it is to be understood that modifications in construction can be made without departing from the scope and spirit of the invention. So, for instance, the guide rolls and support rolls can be arranged in a different manner and the winch and tipper combination can be other than the one described hereinabove. The longitudinal rails 3 can vary in shape, but in general they should be such as to guide the obliquely advancing load bottom longitudinally onto the truck chassis.

We claim:

1. In combination, a motor truck having a tiltable body, means arranged to tilt said body around a transverse horizontal axis at the rear portion of said body, respective laterally directed projections at the rear portion of said body, a load receptacle adapted to be slidably supported on said body, winch means on said body including a cable, means connecting said cable to the forward portion of said load receptacle and arranged to elevate said receptacle onto said body when the winch means is operated, respective longitudinally extending resilient guides secured to the rear portion of said load receptacle and arranged to engage said projections, and means on said guides cooperating with said projections to limit longitudinal movement of the load receptacle on said body.

2. In combination, a motor truck having a tiltable body, means arranged to tilt said body around a transverse horizontal axis at the rear portion of said body, respective laterally directed projections at the rear portion of said body, a load receptacle adapted to be slidably supported on said body, winch means on said body including a cable, means connecting said cable to the forward portion of said load receptacle and arranged to elevate said receptacle onto said body when the winch means is operated, and respective longitudinally extending resilient guides secured to the rear portion of said load receptacle and arranged to engage said projections, said guides being formed with perforations cooperating with said projections to limit longitudinal movement of the load receptacle on said body.

3. In combination, a motor truck having a tiltable body, means arranged to tilt said body around a transverse horizontal axis at the rear portion of said body, respective laterally directed projections at the rear portion of said body, transversely extending roller means mounted on the rear portion of said body, a load receptacle adapted to be slidably supported on said roller means, winch means on said body including a cable, means connecting said cable to the forward portion of said load receptacle and arranged to elevate said receptacle onto said roller means when the winch means is operated, and respective longitudinally extending resilient guides secured to the rear portion of said load receptacle and arranged to engage said projections, said guides being formed with perforations cooperating with said projections to limit longitudinal movement of the load receptacle on said body.

4. In combination, a motor truck having a tiltable body, means arranged to tilt said body around a transverse horizontal axis at the rear portion of said body, a transverse shaft mounted on the rear portion of said body, a plurality of rollers mounted on said shaft, a load receptacle adapted to be movably supported on said rollers, winch means on said body including a cable, means connecting said cable to the forward portion of said load receptacle and arranged to elevate said receptacle onto said rollers when the winch means is operated, respective longitudinally extending resilient guides secured to the rear portion of said load receptacle and arranged to engage the ends of said shaft, and means on said guides cooperating with the ends of said shaft to limit longitudinal movement of the load receptacle on said body.

5. In combination, a motor truck having a tiltable body, means arranged to tilt said body around a transverse horizontal axis at the rear portion of said body, a transverse shaft mounted on the rear portion of said body, a plurality of rollers mounted on said shaft, a load receptacle adapted to be movably supported on said rollers, winch means on said body including a cable, means connecting said cable to the forward portion of said load receptacle and arranged to elevate said receptacle onto said rollers when the winch means is operated, and respective longitudinally extending guides secured to the rear portion of said load receptacle and arranged to engage the ends of said shaft, said guides being formed with perforations cooperating with the ends of said shaft to limit longitudinal movement of the load receptacle on said body.

MIKKO JOOSEPPI TERHO.
MAUNO ANTTI TERHO.

REFERENCES CITED

The following references are of record in the file of this patent:

UNITED STATES PATENTS

| Number | Name | Date |
|---|---|---|
| 1,458,047 | Gosser | June 5, 1923 |
| 1,870,573 | Kuchar | Aug. 9, 1932 |
| 2,016,130 | Wren | Oct. 1, 1935 |
| 2,493,099 | Adams | Jan. 3, 1950 |
| 2,508,740 | Alvare | May 23, 1950 |

FOREIGN PATENTS

| Number | Country | Date |
|---|---|---|
| 50,510 | Netherlands | May 16, 1941 |